(12) United States Patent
Papagiannaki et al.

(10) Patent No.: US 7,519,705 B1
(45) Date of Patent: Apr. 14, 2009

(54) METHOD FOR COMPUTING AGGREGATE TRAFFIC BETWEEN ADJACENT POINTS OF PRESENCE IN AN INTERNET PROTOCOL BACKBONE NETWORK

(75) Inventors: Konstantina Papagiannaki, Burlingame, CA (US); Nina Taft, San Francisco, CA (US); Christophe Diot, Villefranche sur mer (FR)

(73) Assignee: Sprint Communications Company L.P., Overland Park, KS (US)

( * ) Notice: Subject to any disclaimer, the term of this patent is extended or adjusted under 35 U.S.C. 154(b) by 908 days.

(21) Appl. No.: 10/616,795

(22) Filed: Jul. 10, 2003

(51) Int. Cl.
*G06F 15/173* (2006.01)
*G06F 15/16* (2006.01)

(52) U.S. Cl. .................. 709/224; 709/232; 709/241
(58) Field of Classification Search ............... 703/223, 703/224; 709/200, 223, 224, 232, 241
See application file for complete search history.

(56) References Cited

U.S. PATENT DOCUMENTS

| | | | |
|---|---|---|---|
| 6,882,930 B2 * | 4/2005 | Trayford et al. | 701/117 |
| 2002/0141342 A1 * | 10/2002 | Furman et al. | 370/235 |
| 2002/0143928 A1 * | 10/2002 | Maltz et al. | 709/224 |

* cited by examiner

*Primary Examiner*—Ario Etienne
*Assistant Examiner*—El Hadji M Sall

(57) ABSTRACT

The present invention provides a method for computing traffic between a pair of Points of Presence in an IP network by summing link utilization values measured for each link connecting a pair of Points of Presence and dividing the sum by the number of link utilization values included in the sum. The resulting average link utilization is the average link utilization of any link in the aggregate and may be multiplied by the number of active links connecting a pair of Points of Presence to reflect the total amount of traffic between the two Points of Presence. Future link utilization may be forecast by modeling the observed traffic between a pair of Points of Presence using wavelet multiresolution analysis to create an approximation curve that captures the long-term trend of link utilization and at least one detail curve that captures the short term deviation of link utilization around the long-term trend. A time series model of the approximation curve may then be constructed and used for forecasting. In a similar fashion, deviation of link utilization may be forecast.

24 Claims, 13 Drawing Sheets

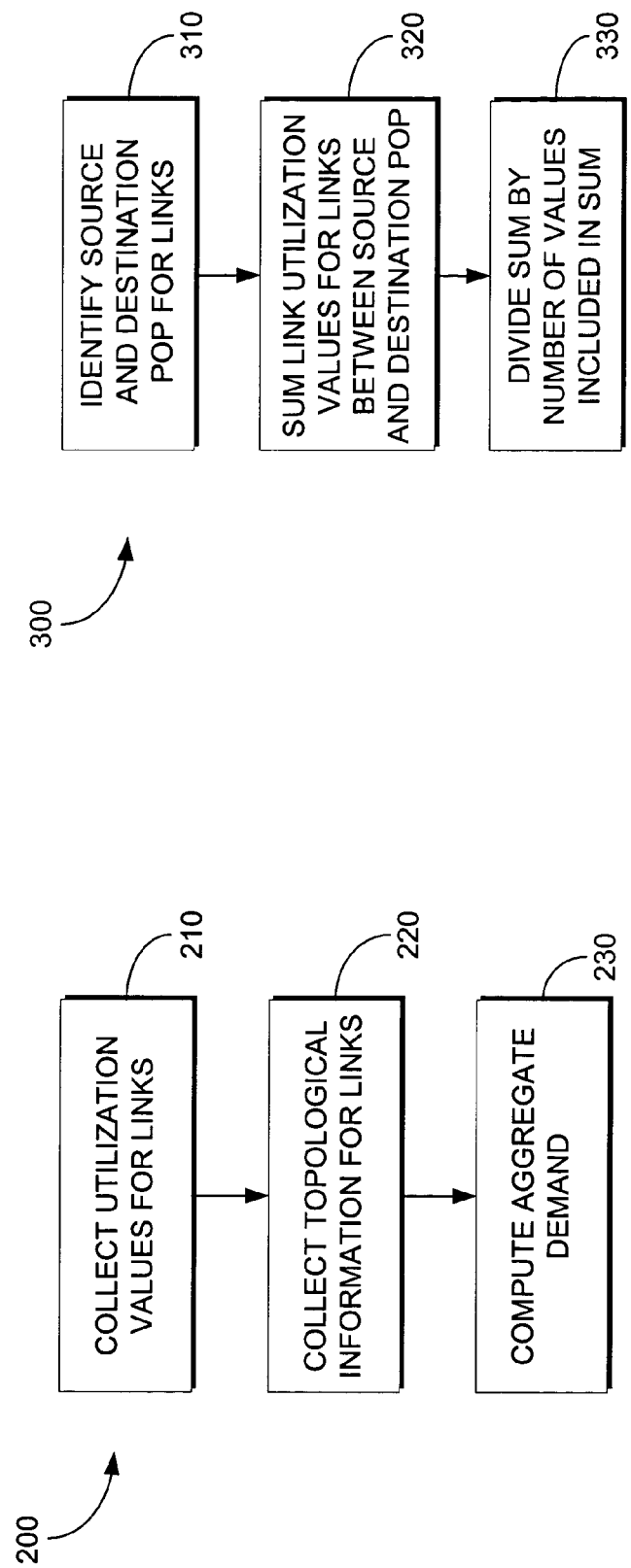

METHOD FOR COMPUTING AGGREGATE TRAFFIC BETWEEN ADJACENT POINTS OF PRESENCE IN AN INTERNET PROTOCOL BACKBONE NETWORK

CROSS-REFERENCE TO RELATED APPLICATIONS

None.

STATEMENT REGARDING FEDERALLY SPONSORED RESEARCH OR DEVELOPMENT

None.

The present invention relates to internet protocol networks. More particularly, the present invention relates to the computation of aggregate traffic between adjacent Points of Presence in an internet protocol network and the forecasting of future link utilization between Points of Presence in an internet protocol network.

BACKGROUND OF THE INVENTION

Internet protocol networks, often referred to as "IP networks" carry data throughout the United States and abroad. The data carried on an IP network may be related to internet transmissions, but may also include other types of transmissions, such as voice transmissions using voice over IP protocols, or any other type of data formatted for transmission using internet protocols.

IP networks typically comprise very high bandwidth optical carriers, such as OC-48 and OC-192 links. These high capacity links connect the Points of Presence of the network. Each Point of Presence contains one or more routers in the same geographical location that receive and direct data packets over the links of the IP network. A single Point of Presence often referred to as a "PoP", will often be directly connected to multiple other PoPs. Any pair of PoPs may be connected by a plurality of links, typically of equal capacity. An IP network may be highly dynamic, for example due to link changes as links fail, as links are serviced, and as new links are added.

Establishing new links between a pair of Points of Presence, a process referred to as "provisioning", often requires a long timeframe, often at least several months. For this reason, accurately predicting future demand on links between PoPs several months into the future is critical for capacity planning purposes. If the operator of an IP network does not begin the process of provisioning new links before traffic between a pair of adjacent PoPs has exceeded the target capacity of the network, the IP network will be compromised for a considerable time while the new link is established.

BRIEF SUMMARY OF THE INVENTION

The present invention provides a method for computing aggregate IP network traffic between adjacent PoPs and for forecasting future IP network traffic between adjacent PoPs. Adjacent PoPs are PoPs that are connected directly via a link with no intermediate PoP. Both the computation of aggregate traffic and the forecasting of future traffic are useful for IP network capacity planning.

Current IP network usage is measured and computed by measuring link utilization at predetermined intervals. Further topological information is obtained to identify the links directly connecting PoPs in the IP network. The total demand between any pair of adjacent Points of Presence may be computed by summing the utilization values collected for the links connecting those Points of Presence, while the average demand between those Points of Presence may be computed by dividing the sum by the number of utilization values included in the sum.

Future IP network demand can be forecast, in accordance with the present invention, by first modeling collected network utilization data as an approximation signal. Time series models of the approximation signal may then be constructed and evaluated in comparison to the collected link utilization data. The linear time series model that best matches collected link utilization data can then be used to forecast future link utilization demands. In a similar fashion, the deviation of link utilization may be calculated and forecast.

BRIEF DESCRIPTION OF THE SEVERAL VIEWS OF THE DRAWING

The present invention is described in detail below with reference to the attached drawing figures, wherein:

FIG. 2 illustrates a method in accordance with the present invention for collecting link utilization data and computing aggregate demand;

FIG. 3 illustrates a method in accordance with the present invention for calculating average link demand;

DETAILED DESCRIPTION OF THE INVENTION

Figure 1:
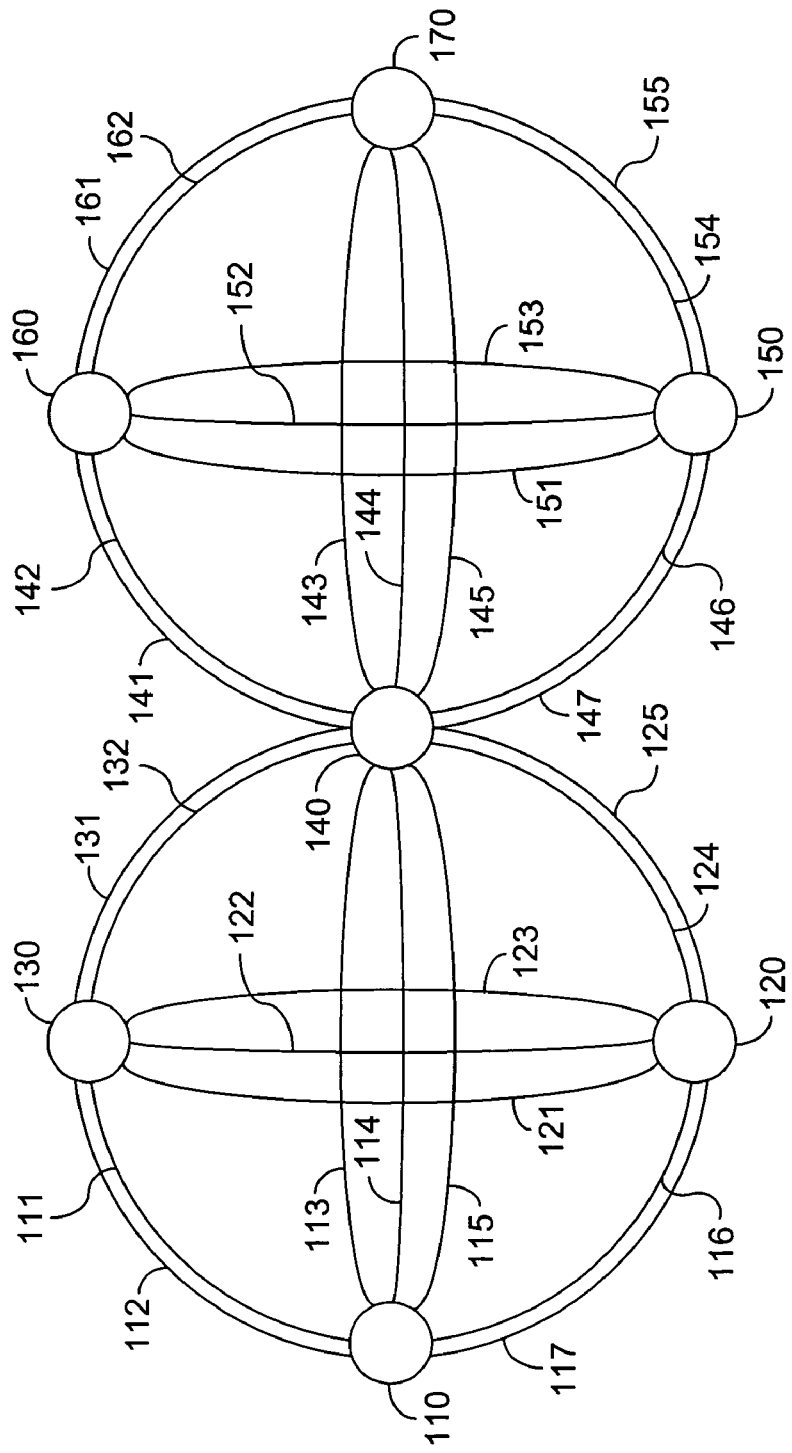
FIG. 1 schematically illustrates a portion of an IP network, the traffic of which may be computed and forecast in accordance with the present invention.

FIG. 1 schematically illustrates a portion 100 of an IP network. The present invention may be utilized in an IP network such as illustrated by portion 100. Network portion 100 includes a plurality of Points of Presence, such as PoP 110. Each PoP is connected to at least one other PoP by a link. For example, the first PoP 110 connects to a second PoP 120 by link 116 and link 117. The first PoP connects to a third PoP 130 by link 111 and link 112. The first PoP 110 may also connect to a fourth PoP 140 by link 113, link 114, and link 115. The second PoP 120 may connect to the third PoP 130 by link 121, link 122, and link 123. The second PoP may connect to the fourth PoP 140 by link 124 and link 125. The third PoP 130 may connect to the fourth PoP 140 by link 131 and link 132. The fourth PoP 140 may connect to a fifth PoP 150 by link 146 and link 147. The fourth PoP 140 may connect to a sixth PoP 160 by link 141 and link 142. The fourth PoP 140 may connect to a seventh PoP 170 by link 143, link 144 and link 145. The fifth PoP 150 may connect to the sixth PoP 160 by link 151, link 152, and link 153. The fifth PoP 150 may connect to the seventh PoP by link 154 and link 155. The sixth PoP 160 may connect to the seventh PoP 170 by link 161 and link 162. It should be realized that the portion of an IP network 100 illustrated in FIG. 1 is illustrative only. In actuality, an IP network may contain a different number of PoPs than those illustrated in FIG. 1, often considerably more than the seven illustrated, and may likewise contain a different number of links than is illustrated in FIG. 1, for example considerably more. Furthermore, any linked pair of PoPs may be connected by any number of links, rather than the two or three links illustrated in FIG. 1. While a single link may be used to connect a pair of PoPs, a large plurality of links may also be used. The number of links used to connect a pair of Points of Presence is a network design decision that may be aided by the practice of the present invention.

The Points of Presence illustrated in FIG. 1, are well known in the art and may comprise any number of physical structures allowing a service provider to provide services at a given location. Typically, a PoP may include a router or similar device to receive and direct data packets over the links.

Link utilization data may be collected from operational routers using, for example, the Simple Network Management Protocol (SNMP). Routers may count the number of packets or bytes transmitted over a particular IP link and report those measurements using SNMP upon request. A network element, usually referred to as a Network Management Station (NMS), may be configured to initiate SNMP requests to operational routers in the IP network at predetermined intervals to collect available link utilization data. Because a single network element may not be able to poll the entire network simultaneously, if a single NMS is used the NMS may poll the entire network within a given period of time, such as five minutes, meaning that the SNMP collection may be asynchronous. Furthermore, the SNMP protocol is an unreliable IP protocol wherein packets may be dropped in a connection without specific notification to the communicating entities. As a result, there may be cases when NMS has issued a request to a router but that router does not reply, due to the reply being lost in the network or due to the router being unable to reply because of other resource intensive tasks. The use of SNMP to collect link utilization data requires that the problems of asynchronous data collection and missing data be overcome. The failure to account for these problems may prevent link utilization models and forecasts from accurately reflecting actual IP network behavior.

The asynchronous data collection may be accounted for by measuring link utilization over a time period greater than the polling interval. For example, for a five minute polling interval, link utilization may be measured over a ninety minute interval. The duration of the time period of the link utilization measurement relative to the duration of the polling interval may vary greatly, although generally the time period of the link utilization measurement may be at least twice the duration of the polling period. This allows all link utilization measurements after the beginning and before the end of the time period to be used even if the data's arrival at the NMS is delayed.

However, the problem of lost data remains. The problem of missing data relates to two different types of missing data. First, some, but not all, utilization values may be missing for a given link. Second, all link utilization values may be missing for a link in the aggregate of links connecting a pair of PoPs.

To overcome the problem of some missing utilization values for a given link, the average aggregate demand between two PoPs may be computed as the sum of the average utilization of each link. The utilization measurements for a link may be summed, and the sum then divided by the number of utilization measurements included in the sum. This process may be completed for each link in the aggregate, with the results for each link then used to compute an average across all links in the aggregate. Accordingly, for a pair of PoPs having N links between them, with a computed average link utilization $l_i$ for each of the N links, the average link utilization between the pair of PoPs may be calculated as:

$$\left(\sum_{i=1}^{N} l_i\right) / N$$

This technique will provide an accurate measure for the average aggregate demand when the missing values result in at least one measurement for each link.

However, if all measurements for a link in one time interval are lost, this methodology will lead to an inaccurate computation of the average aggregate demand, since a zero link utilization will be included in the average for the link with the missing values, even though the link may have been active. To counteract the effect of missing data for an entire time period for a link, the method for measuring aggregate demand may be modified. For each time interval, the SNMP measurements for each link in the aggregate is collected. The collected link utilization values are summed and then divided by the number of values included in the sum. For example, a pair of PoPs may be connected by an aggregate of five links. If, by way of further example, link utilization values are collected at five minute polling periods and link utilization is to be measured over a ten minute time period, then if there is no data loss the total number of link utilization values should be ten, which is two values per link for five links. In this example, the average aggregate link utilization would be computed by dividing the sum by ten. In actual practice, some link utilization values for a single link may be missing for the entire measurement time period. By summing link utilization for all links in the aggregate and dividing by the number of measurements, a more accurate result is obtained for the frequent case where all links connecting a pair of PoPs have equal capacity. Multiplication of the average aggregate link utilization by the number of links in the aggregate may be used to provide a measure of the total traffic between a PoP pair.

Referring now to FIG. 2, a method 200 for determining aggregate demand between a pair of adjacent Points of Presence in accordance with the present invention is illustrated. In step 210 utilization values for links are collected. While step 210 may involve collecting link utilization information for all links in an IP network, as explained above, the collection methodology may not be error-proof, thereby resulting in utilization values not being collected for every link in the IP network for every collection period. Step 210 may involve the routers in the PoPs of an IP network reporting link utilization values. As further described herein, step 210 may be implemented over a predetermined polling period. The utilization values collected in step 210 may be in a variety of forms, such as the total number of bytes received or transmitted, an exponentially weighted moving average, or any other measurement of link utilization. Whatever form is used for link utilization values, link utilization may be reported for a first short time frame. The first short time frame may be as little as a few second, or even less, to several minutes. As explained below, link utilization values for the first short time frame may be averaged over a second longer time frame. The first short time frame may correspond to the polling period, but need not be identical to the polling period. In step 220, topological information is gathered for all links. The topological information gathered in step 220 identifies which link or links connect each pair of adjacent PoPs. Step 220 may be performed at predetermined time intervals. The predetermined time intervals at which step 220 is performed may vary greatly, from the very frequent for a rapidly changing network to the highly infrequent for a very static network. A time interval of one week may be used for many IP networks. The topological information collected in step 220 may be correlated with the link utilization information collected in step 220 so that the utilization of a specific link may be known.

Referring now to FIG. 3, a method 300 for computing aggregate demand is illustrated. In step 310, the source and destination PoPs are identified for all links with collected link utilization data. This may be done by correlating the collected topological information with the collected link utilization values. As a result of step 310, it is known which links connect which Points of Presence and the utilization of those links. In step 320, link utilization values are summed for all links between a source PoP and a destination PoP for a given time period, the time period being a second longer time frame as compared to the first short time frame over which the link utilization values were measured. The time period used in step 320 may be at least twice the duration of the polling period of step 210 of method 200 if method 300 uses data collected using method 200. In step 330, the average aggregate demand is calculated by dividing the sum of step 320 by the number of link utilization values included in that sum. The aggregate link utilization between the adjacent PoPs may be computed by multiplying the average by the number of active links between the pair of PoPs.

For example, to compute the aggregate demand between Point of Presence 110 and Point of Presence 140 illustrated in FIG. 1 link utilization values would be collected for link 113, link 114, and link 115. Collected topological information would identify these links, namely link 113, link 114, and link 115, as the links connecting PoP 110 and PoP 140. The link utilization values for link 113, link 114, and link 115 for the relevant time period would be summed. This sum of link utilization would be divided by the number of collected measurements for all three links in the aggregate connecting Point of Presence 110 and Point of Presence 140.

It should be realized that FIG. 2 and FIG. 3 broadly illustrate methods in accordance with the present invention to collect link utilization information and to compute aggregate demand. It should be appreciated that the steps of the method 200 and method 300 may be performed in varying orders or may occur simultaneously. It should also be realized that some steps, such as collecting link utilization data in step 210 and collecting topological information in step 310, may be omitted, for example if the information to be collected is already available. One example of an application of the present invention is described below. It should be realized that applications of the method described and disclosed in FIG. 2 and FIG. 3 may be employed in ways beyond the examples described below. For example, in the management of large-scale IP networks it may be more convenient to picture an IP network at the granularity of PoPs and aggregate pipes between PoPs, rather than routers and IP links. Further network design principles may be readily deployed on networks abstracted at the PoP level, where IP link utilization is substituted by the average amount of traffic flowing between adjacent PoPs over the multiplicity of links interconnecting the adjacent PoPs.

Figures 4, 5:
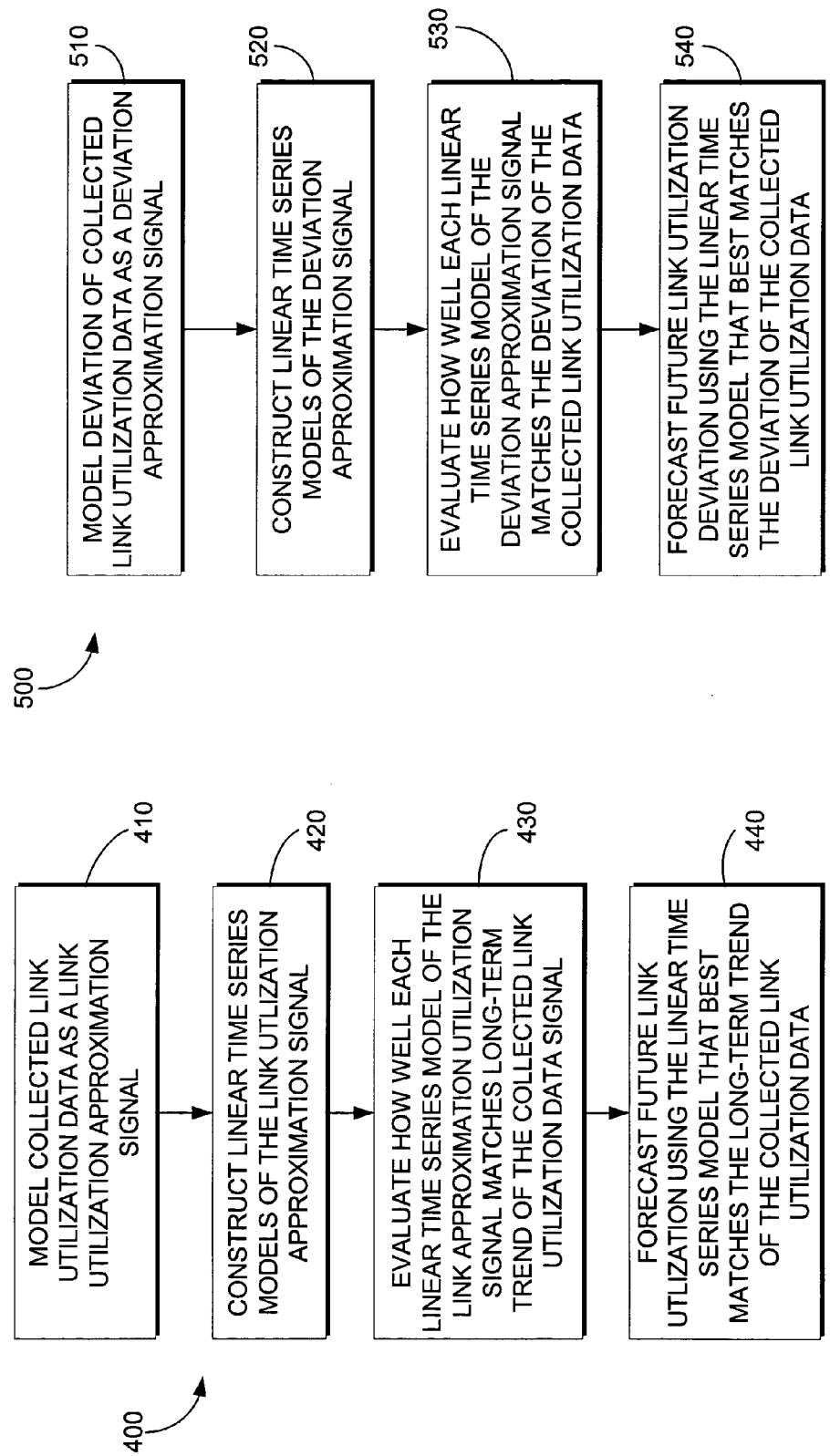
FIG. 4 illustrates a method in accordance with the present invention for forecasting future link utilization.
FIG. 5 illustrates a method in accordance with the present invention for forecasting future deviation of link utilization.

Referring now to FIG. 4, a method 400 for forecasting future link utilization is illustrated. In step 410, collected link utilization data is modeled as a link utilization approximation signal. One example of appropriately modeling collected link utilization data is the use of wavelet multiresolution analysis, including à-trous modeling techniques as discussed below, although other modeling methods may be used in conjunction with the present invention. In step 420, a time series model is constructed for the link utilization approximation signal. The time series model constructed in step 420 maybe a linear model, thereby simplifying the construction of the model. Examples of the construction of appropriate linear time series models of the link utilization approximation signal are described below, such as the use of auto-regressive modeling, moving average modeling, and auto-regressive moving average modeling. As described further below, an ARIMA model may be constructed in step 420. It should be understood, however, that other models of the link utilization approximation signal may be used. A large number of models may be constructed in conjunction with step 420. In step 430, the quality of the time series models' description of the link utilization approximation signal is determined. Step 430 determines which of the models best describes the link utilization approximation signal. One skilled in the art will realize that a variety of criteria may be used to determine which model is the best fit for the data. A variety of methods may be used in step 430, such as those described in the example below. In step 440, future link utilization is forecast using the time series model that best matches the collected link utilization data. It should be noted that if only one time series model is constructed, step 430 of determining the quality of the time series model may be omitted, and in step 440 future link utilization will be forecast using that time series model. However, the use of a single time series model will run a high risk of poorly fitting collected link utilization data and providing a correspondingly poor forecast of future link utilization. Accordingly, while the use of a single time series model is within the scope of the present invention, the use of a plurality of time series models may often provide a better forecast, due to there being a larger number of models from which to choose the model that best fits the approximation signal.

Referring now to FIG. 5, a method 500 for forecasting future deviation around the forecast link utilization baseline is illustrated. The deviation of link utilization may be thought of as the fluctuation of link utilization around the long-term trend. As explained below in an exemplary description of a method in accordance with the present invention, link utilization over time may demonstrate both a long-term trend and short term periodicities. The short term periodicities may be, for example, over periods of twelve hours, twenty-four hours, and a week. In modeling and forecasting link utilization, accounting for such deviation may be important to accurately plan future network capacity. Because the deviation occurs around the long-term trend, even a perfectly accurate forecast of the long-term trend of the utilization of a link may overstate or, more problematically for network capacity planning, understate link demand, due to this deviation. Accordingly, method 500 for forecasting future link utilization deviation may be used to account for this deviation of link utilization.

In step 510, the deviation of collected link utilization data is modeled as a deviation approximation signal. It should be noted that the deviation approximation signal constructed in step 510 of method 500 may be constructed in conjunction with the link utilization approximation signal constructed in step 410 of method 400. As described in the example of one use of methods in accordance with the invention described below, the deviation approximation signal may be selected from the detail signals constructed using wavelet multi-resolution analysis and/or à-trous modeling to reconstruct the collected link utilization data. It should be appreciated that other modeling techniques may be used, however. In step 520, a time series model of the deviation approximation signal is constructed. The time series model constructed in step 520 may be a linear model, thereby simplifying the construction of the model. One example of linear time series models is described below, such as the use of to auto-regressive modeling, moving average modeling, and auto-regressive moving average modeling. Of course, other modeling methods may be used. In step 530, the quality of each time series model of the deviation approximation signal is evaluated as compared to the computed deviation approximation signal. The example below describes some methods for evaluating the time series models, although other methods may be used. In step 540, future link utilization deviation is forecast using the time series model that best matches the deviation of the collected link utilization data. It should be noted that if only one time series model is constructed, step 530 of determining the quality of the time series model may be omitted, and in step 540 future deviation of link utilization will be forecast using that time series model. As with method 400, however, the use of a single time series model of link utilization deviation, while within the scope of the present invention, may not provide an accurate forecast of future link utilization deviation due to the possible lack of a model that fits the deviation approximation signal well.

A specific example of collecting link utilization data and computing aggregate demand using method 200 and method 300, and then forecasting a link utilization using method 400 and method 500 is described below. The example discussed below involves the experimental collection, analysis, modeling, and forecast using link utilization data collected from an existing IP network. The example described below is an exemplary description of one application of the present invention, and is not intended to limit the scope of the present invention, but to merely demonstrate one possible use of it.

Figure 6:
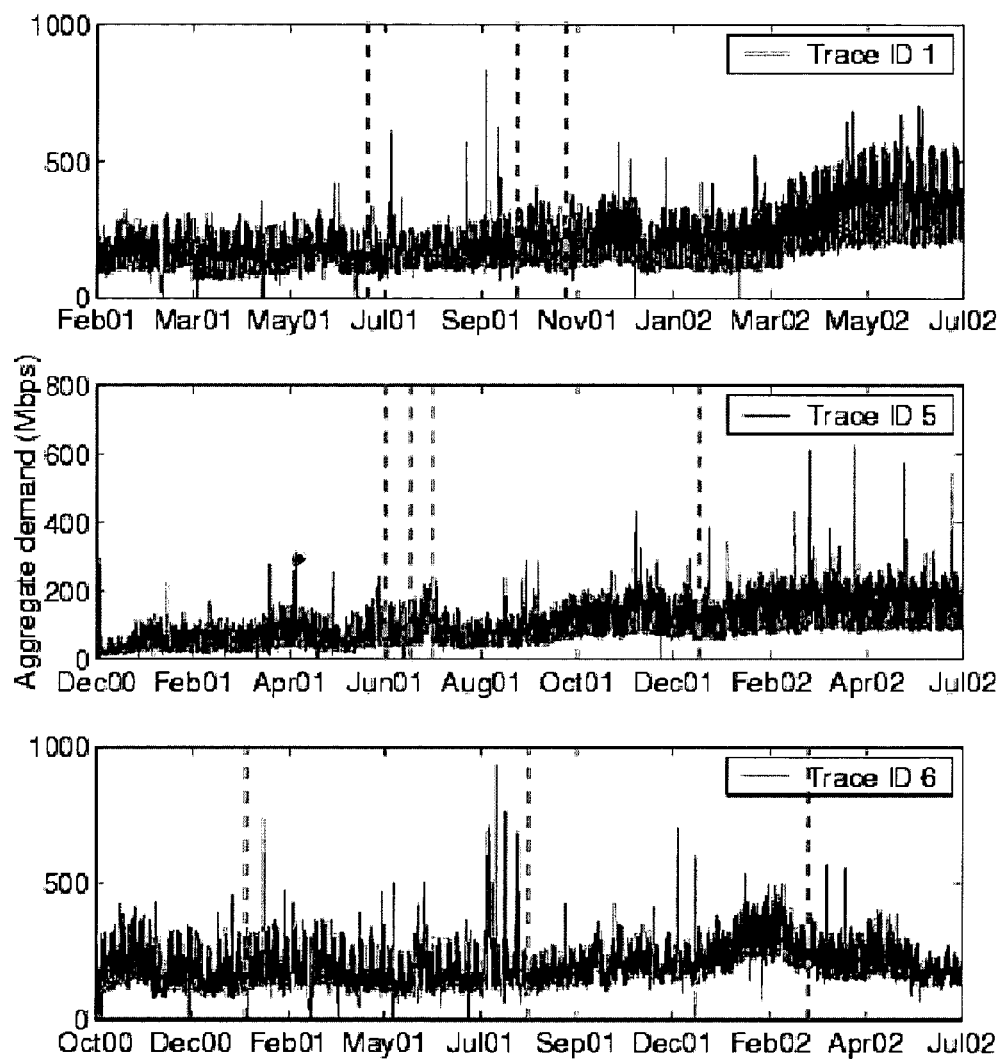
FIG. 6 illustrates collected link utilization data.

Referring now to FIG. 6, aggregate link utilization obtained using method 200 and method 300 for three traces is shown. A trace represents the connection between a pair of PoPs, which may include any number of links in the aggregate. As can be seen in reference to FIG. 6, the data was collected from October 2000 to July 2002. Trace utilization is shown as aggregate demand measured in megabits per second. The data illustrated in FIG. 6 is SNMP data collected from routers for incoming and outgoing link utilization. The collection of the data used to determine the aggregate values illustrated in FIG. 6 was not synchronized, in that not all links were polled at the same time. Polling all links simultaneously could overload the IP network and the collection station. Values collected correspond to an exponentially weighted moving average computed on ten second link utilization measurements. The exponential weighted average collected had an average age of five minutes, with more recent samples being weighted more heavily than earlier taken samples. These measurements were taken using objects in two proprietary management information base objects, which collected the data used in a proprietary method not available to the inventors. Other collection methods, including the use of other time periods and other averaging methods, may be employed with the present invention. Of course, whatever collection method is employed should preferably be consistent for all links. Topological information was also collected from the routers. The topological information included the routers identity, the links connected to that router, and the destination routers for those links. The collected SNMP data was correlated with collected topological information so that the link utilization data could be correlated to the link to which that data relates. The PoPs containing the routers involved were also identified.

Calculating the aggregate demand illustrated in FIG. 6 requires that, for each link in the SNMP data, its source and destination Point of Presence be identified. The notation $l_{sd}(k)$ may denote the $k^{th}$ link connecting Point of Presence s to Point of Presence d. Next, time was discretized into ninety minute intervals. While other time intervals may be used, the ninety minute interval was useful for demonstrating periodicities in the data and facilitating modeling, as shall be discussed below. Each ninety minute time interval was indicated with an index t. The aggregate demand for any Point of Presence pair, for example PoP s and PoP d at a time interval t was calculated as the sum of all the records obtained at that time interval t for all links between that PoP s and PoP d divided by the total number of link utilization records. The result was the average aggregate demand of a link between PoP s and PoP d at the time interval t. The above-described approach allowed for missing values for particular links in the aggregate to be accommodated. Moreover, possible inaccuracies in the SNMP measurements were smoothed by the averaging operation. FIG. 6 illustrates this aggregate demand as the time index t advances.

In generally reviewing FIG. 6, which illustrates aggregate link utilization for three exemplary traces, certain observations can be made as to the link utilization behavior. Each trace also shows a deviation of link utilization, some greater than others, and sometimes the deviation changes over time. For example, link utilization for trace one shows increasing deviation as t advances. Each trace has a different overall long-term trend. For example, trace one and trace five show increasing link utilization as a long-term trend, while trace eight does not show an immediately discernible long-term trend of increased link utilization. There are also several utilization spikes for each trace. These spikes illustrate sharp short term increases in link demand, significant enough in magnitude, duration, or both that they were not smoothed away by the averaging operation. Such sharp short term increases in link utilization may result from link failures elsewhere in the IP network that cause traffic to be rerouted to that link, denial of service attacks, routing changes, or other short lived but substantial circumstances that cause a peak in traffic. While the methods in accordance with the present invention take this data into account in constructing models of link utilization and deviation of link utilization, the methods in accordance with the present invention do not attempt to predict the occurrences of such spikes, thus treating them as outliers.

Figure 7:
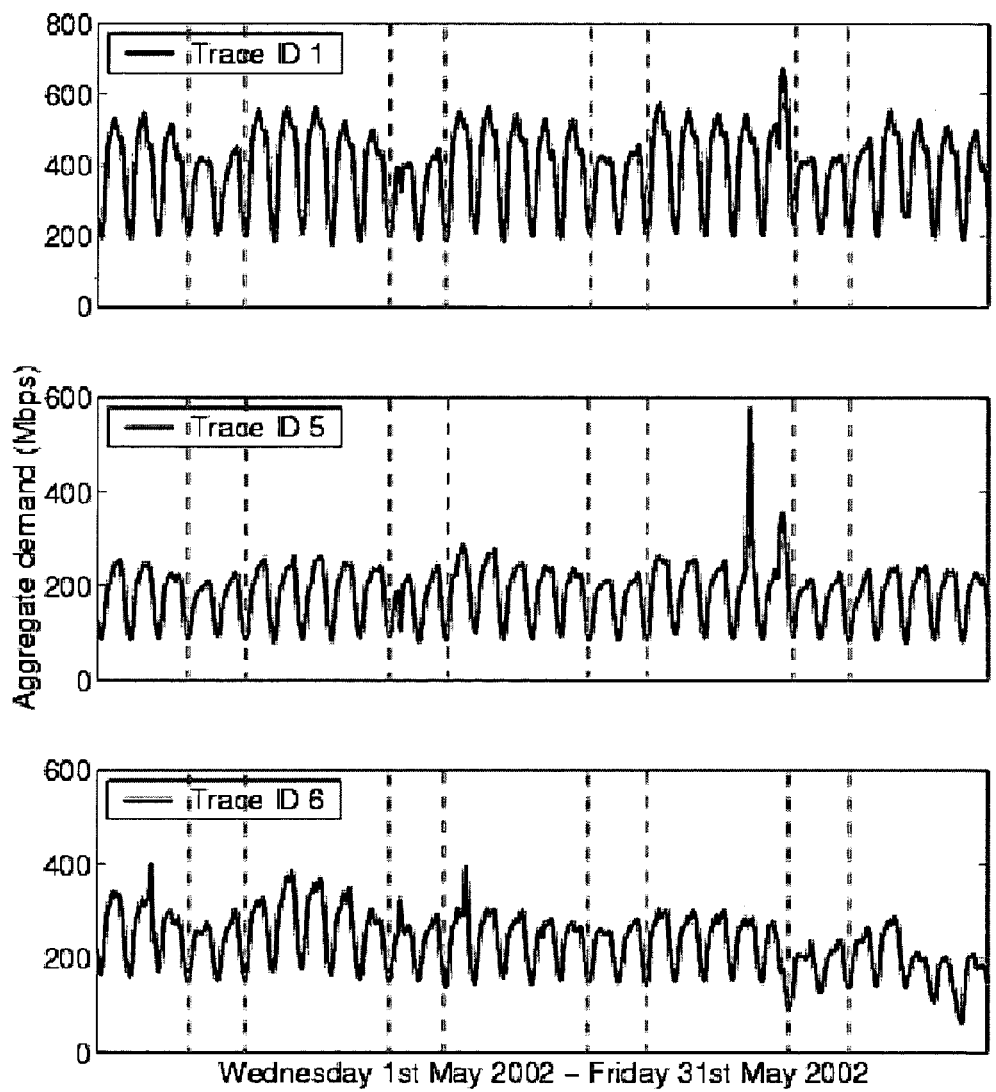
FIG. 7 illustrates a collected link utilization data at a small time scale.

Referring now to FIG. 7, a more detailed view of aggregate link utilization data for a shorter time frame is illustrated. FIG. 7 illustrates link utilization for the month of May 2002 for the traces illustrated in FIG. 6. One observing FIG. 7 will note that there appear to be strong periodicities in the data, mostly on scales of roughly a week and/or of a day. Not all three traces illustrated show the same periodicities or the same degree of periodicity.

Figure 8:
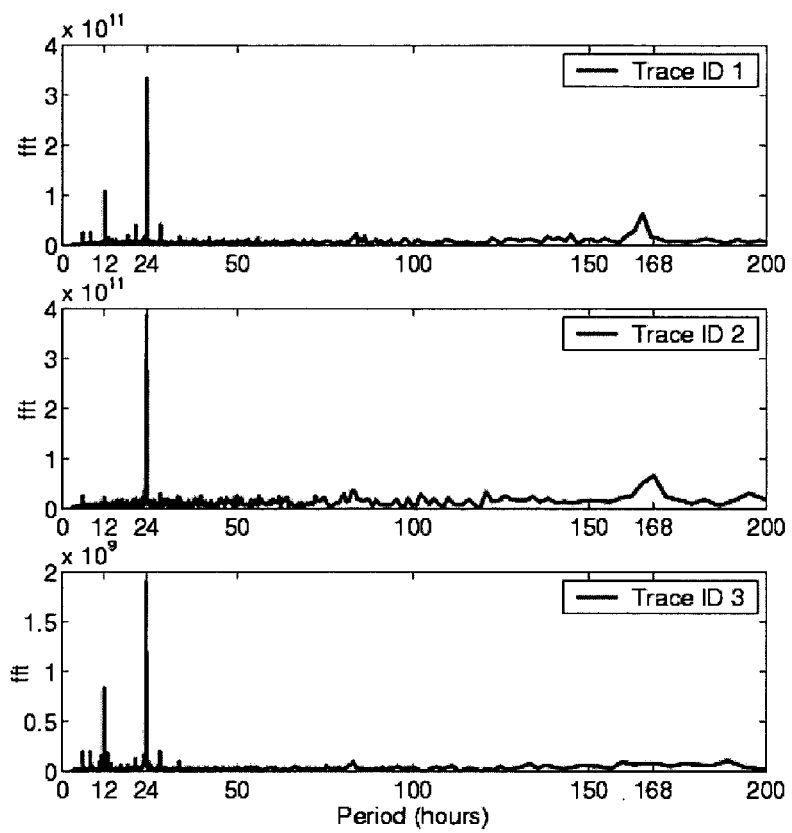
FIG. 8 illustrates the periodicity of collected link utilization data in the form of Fourier transforms of collected link utilization data.

FIG. 8 further illustrates the periodicities of the data in FIG. 7 discussed above. FIG. 8 illustrates a Fast Fourier Transform of the data illustrated in FIG. 7 for aggregate link utilization data for the month of May 2002. As shown in FIG. 8, all three traces exhibit strong periods of twenty-four hours. Trace one and trace three exhibit a weaker twelve hour periodicity. Trace one and trace two exhibit a weaker, but still noticeable, periodicity at one hundred sixty-eight hours, which corresponds to one week.

In further reference to FIG. 6, FIG. 7 and FIG. 8, additional observations regarding the collected link utilization data may be made. First, utilization of different traces vary in different ways and at different time scales, which is to say there is a multi-time scale variability across all traces. Second, there are strong periodicities in the data, although the strength and nature of those periodicities are not identical for all traces. Third, the collected link utilization data demonstrates evident long-term trends that vary for different traces, which may be described as nonstationary behavior. These general properties may be exploited in accordance with the present invention to forecast future behavior.

The collected link utilization data may be modeled using wavelet multiresolution analysis. Wavelet multiresolution analysis describes the process of synthesizing a discrete signal, such as the aggregate link demand, by beginning with a low resolution signal, i.e., a signal at a coarse time scale, and successively adding details onto that signal to create a higher resolution version of the signal. The wavelet multiresolution analysis process ends with a complete synthesis of the original signal at the finest resolution, which is say at the finest time scale. The finest time scale as described in this example is a ninety minute time scale, as the measurements are averaged over a ninety-minute period. At each time scale $2^j$, the signal is decomposed into an approximate signal, or an approximation, and a detailed signal through a series of scaling of functions $\phi(t)$ and wavelet functions $\psi(t)$ where $k \in Z$ is a time index at scale j. The scaling and wavelet functions are obtained by dilating and translating the mother scaling functions $\phi(t)$, $\phi_{j,k}(t)=2^{-j/2}\phi(2^{-j}t-k)$ and the mother wavelet function $\psi(t)$, $\psi_{j,k}(t)=2^{-j/2}\psi(2^{-j}t-k)$. The approximation is represented by a series of scaling coefficients $a_{j,k}$ and the detail is represented by a series of wavelet coefficients $d_{j,k}$. For a signal, such as the illustrated trace utilization data, denoted x(t), with N data points at the finest of time scale, the multiresolution analysis can be written as:

$$x(t) = \sum_{k \in Z} a_{p,k} \varphi_{p,k}(t) + \sum_{0 \leq j \leq p} \sum_{k \in Z} d_{j,k} \psi_{j,k}(t)$$

In the above equation, $p \leq \log N$. The sum of the coefficients $a_{p,k}$ represents the approximation at the coarsest time scale $2^p$, while the sums of coefficients $d_{j,k}$ represent the details on all the scales between 0 and p.

One skilled in the art of signal processing will appreciate that the roles of the mother scaling and wavelet function $\phi(t)$ and $\psi(t)$ can be described and represented using a low-pass filter h and a high-pass filter g. As a result, the multiresolution analysis and synthesis of a signal x(t), such as the illustrated trace utilization data, can be implemented efficiently as a filter bank. The approximation at scale j, $\{a_{j+1,k}\}$ is passed through the low-pass filter h and the high-pass filter g to produce the approximation, $\{a_{j+1,k}\}$, and the detail $\{d_{j+1,k}\}$, at scale j+1. At each stage the number of coefficients at scale j is decimated into half at scale j+1, due to down-sampling. This decimation reduces the number of data points to be processed at the coarser time scales, but can also leave artifacts in the coarser time scale approximations.

A so-called à-trous wavelet transform has also been developed, which produces a smoother approximation by filling in the gaps caused by the decimation, as described above, by using redundant information from the original signal. Under the à-trous wavelet transform, approximations for a signal x(t), such as the illustrated trace utilization data, are defined at different time scales as:

$$c_0(t) = x(t)$$

$$c_j(t) = \sum_{l=-\infty}^{\infty} h(l) c_{j-1}(t + 2^{j-1} l).$$

In the above, $1 \leq j \leq p$, and h is a low-pass filter with a compact support. The detail of signal x(t) at scale j is given by:

$$d_j(t) = c_{j-1}(t) - c_j(t)$$

If $d_j = \{d_j(t), 1 \leq t < N\}$ denotes the wavelet coefficient at scale j, and $c_p = \{c_p(t), 1 \leq t < N\}$ denotes the signal at the lowest resolution, which is often referred to as the residual, then the set of $d_1, d_2, \ldots, d_p, c_p$ represents the wavelet transform of the signal up to the resolution p, and the signal x(t) can be expressed as an expansion of its wavelet coefficients:

$$x(t) = c_p(t) + \sum_{j=1}^{p} d_j(t)$$

At this point, the collection of data across ninety minute intervals is particularly useful. As discussed above with regard to the Fast Fourier Transforms of link utilization data and the periodicity of the collected link utilization data, the collected measurements exhibit strong periodicities at the cycles of twelve and twenty-four hours. Using ninety minutes, or one and a half hours, as the finest time scale allows the behavior of the time series to be easily examined at the periods of interest by observing its behavior at the third time scale (twelve hours) and fourth time scale (twenty-four hours).

To smooth the data using the à-trous wavelet transform, the low pass filter h from Equation 3 may be selected using the $B_3$ spline filter, defined by (1/16, 1/4, 3/8, 1/4, 1/16). This selection is of compact support, which is necessary for a wavelet transform, and is point symmetric, which prevents the wavelets from experiencing phase shifts and drifting relative to the original signal. Each level of resolution the $B_3$ spline filter gives a signal which is smoother than the one at the previous level without distorting possible periodicities in the data and while preserving the original structure of the signal.

Figure 9:
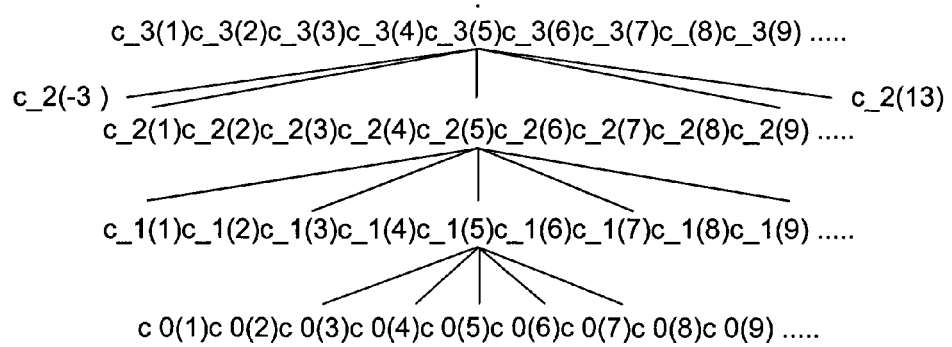
FIG. 9 illustrates an á trous wavelet transform that may be used in accordance with the present invention to model collected link utilization data.

In order to understand how $c_j(t)$ was computed at each time scale j, the computation is schematically represented in FIG. 9. Element $c_1(5)$ is computed based on the value $c_0(t)=x(t)$ at times (5−2), (5−1), 5, (5+1), and (5+2). Then $c_2(5)$ may be calculated based on $c_0(t)$, $c_1(3)$, $c_1(5)$, $c_1(7)$, and $c_1(9)$. Moving toward coarser levels of resolution requires values from the previous resolution level which are farther apart from each other. It should be noted that $c_p(t)$, is defined for each t=1, 2, …, n, where n corresponds to the ninety minute, or one and a half hour, interval at which measurements were taken and is limited by the size N of the original signal. Accordingly, computing $c_p(n)$ requires values $c_{p-1}$ until time $n+2^p$, which iteratively requires values of $c_{p-2}$ until time $n+2^{p-1}$, etc. As a consequence, the calculation of $c_p(n)$ requires that the original time series $x(t)$ have $n+\Sigma_{j=1}^{j=p}2^j$ values. Because the original signal contained N values, the wavelet coefficients up to the sixth resolution level will contain n values, where $n+\Sigma_{j=1}^{j=p}2^j=N$, or $n=N-126$.

Figure 10:
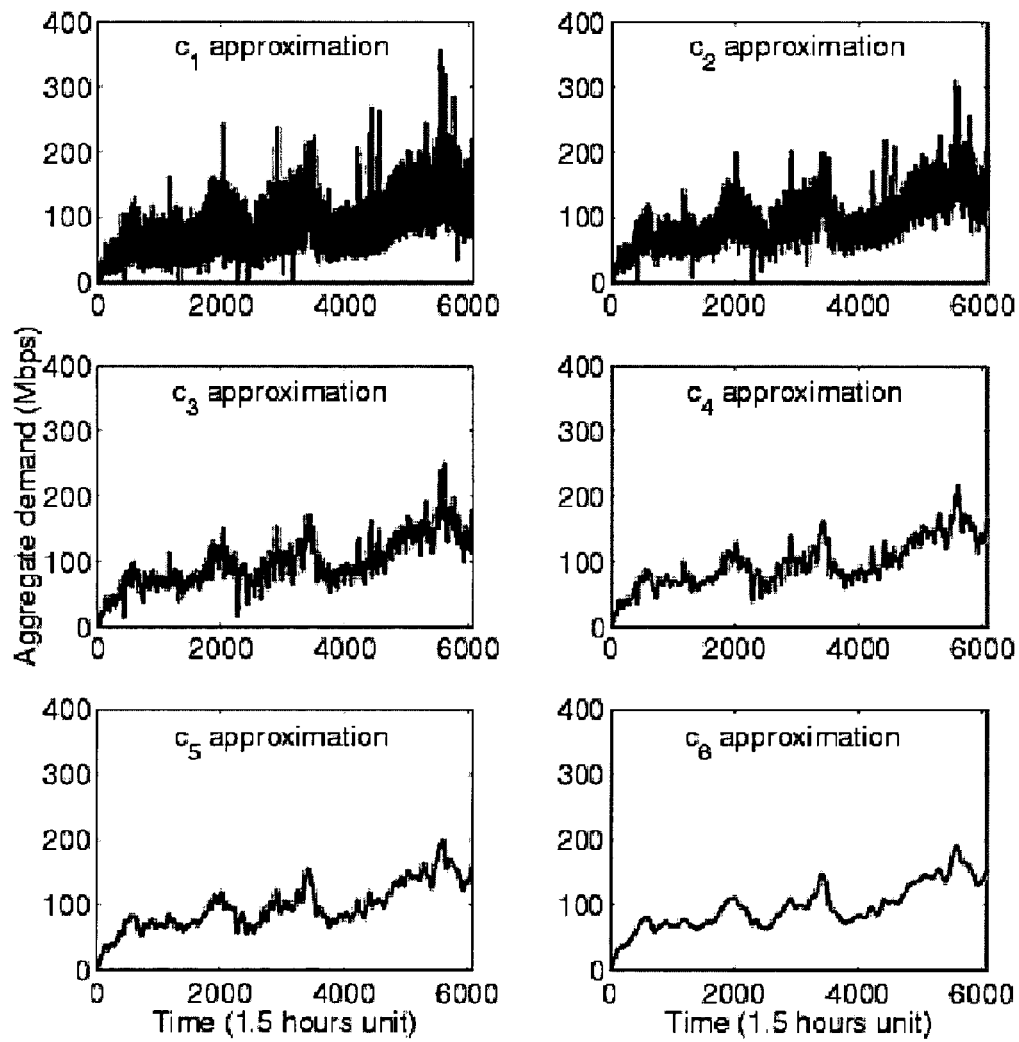
FIG. 10 illustrates approximation signals modeling the collected link utilization data.
Figure 11:
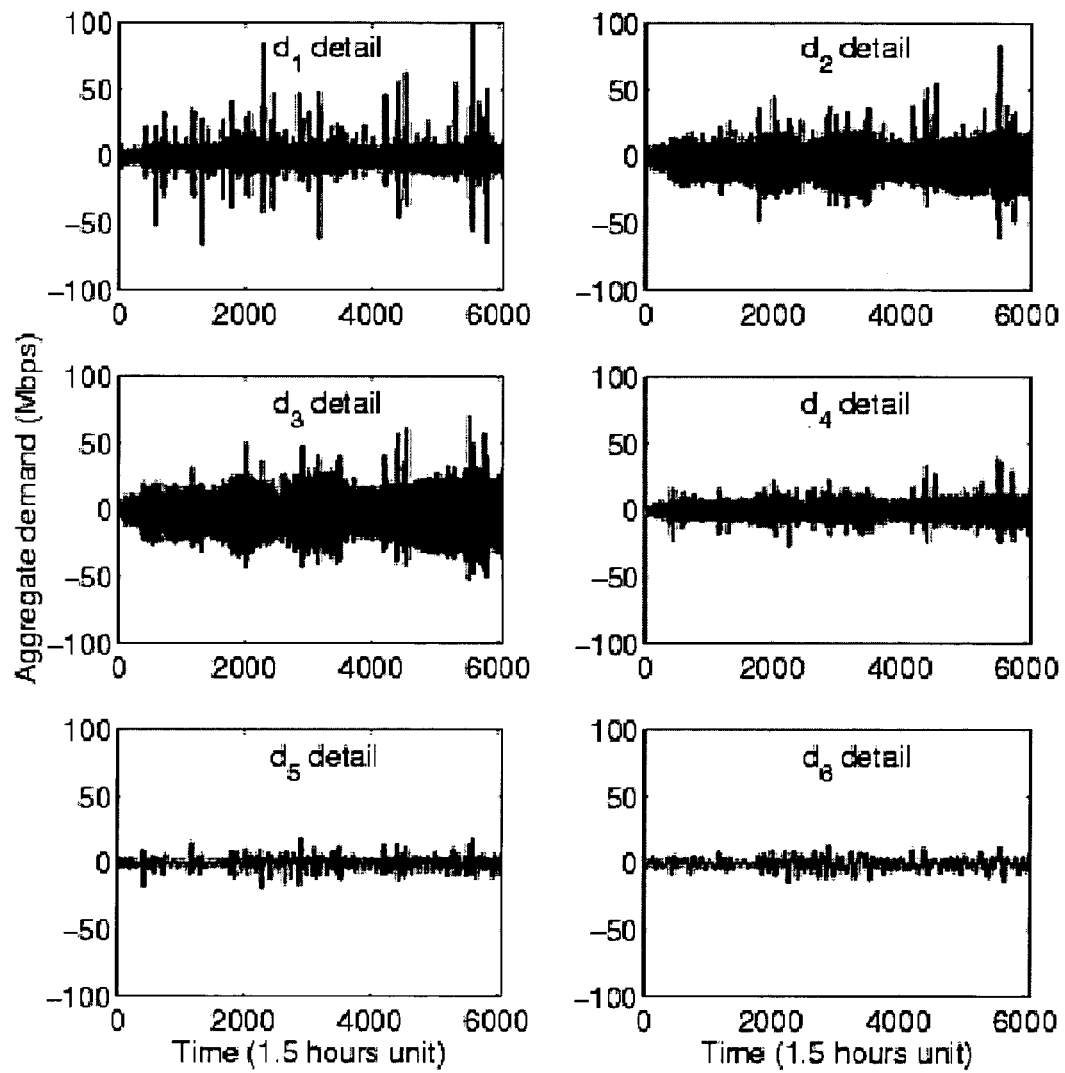
FIG. 11 illustrates detail signals used in modeling the collected link utilization data.

The results after the analysis as described above are further illustrated in FIG. 10 and FIG. 11. FIG. 10 and FIG. 11 show the approximation and detail signals for trace five at each time scale, the coarsest of which is the resolution level 26, or ninety-six hours. The sixth time scale is chosen as the coarsest because it provides a sufficiently smooth approximation signal and captures the evolution of the time series from week to week without being affected by the fluctuations at twelve and twenty-four hours. FIG. 11 shows the detail signals for trace five at each of the time scales.

Using the derived decomposition signals, the energy apportioned to the overall trend in trace $c_6$ and each one of the detail signals illustrated in FIG. 11 can be calculated. The energy of a signal $y(t)$, where $1 \leq t \leq N$, is defined as $E=\Sigma_{t=1}^{n}y^2(t)$. The results of the energy calculation for exemplary traces are:

| Trace ID | 1 | 2 | 3 | 4 |
|---|---|---|---|---|
| $c_6$ | 96.07% | 97.20% | 95.5% | 96.5% |
| $c_6 + d_3$ | 98.10% | 98.76% | 97.93% | 97.91% |
| Trace ID | 5 | 6 | 7 | 8 |
| $c_6$ | 95.12% | 95.99% | 95.84% | 97.30% |
| $c_6 + d_3$ | 97.54% | 97.60% | 97.68% | 98.45% |

The overall trend $c_6$ accounts for approximately 95% to 97% of the total energy of the signal. If the overall trend is subtracted from the data, a substantial difference in the amount of energy distributed among the detail signals may be observed.

Figure 12:
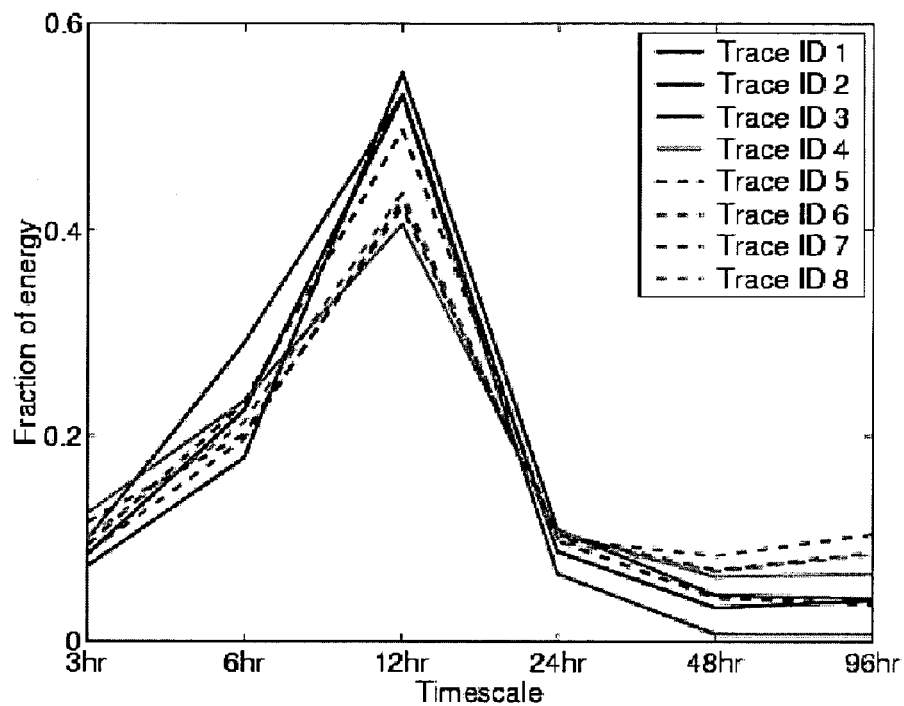
FIG. 12 illustrates the energy distribution for the detail signals illustrated in FIG. 11.

This difference in energy in the detail signals is illustrated in FIG. 12. As FIG. 12 shows, once the overall trend is subtracted from the data, the maximum amount of energy in the details is located at the third time scale, which corresponds to periodicity over twelve hours. If the original signal is approximated using the long-term trend, denoted as $c_6$, and the fluctuations at the twelve hour time scale, which is denoted $d_3$, this combination is capable of accounting for 97 to 99% of the total energy of the collected link utilization data.

As explained above, the original signal of the collected link utilization data can be completely reconstructed using the approximation signal at the sixth time scale and the six detail signals at lower time scales. The wavelet multiresolution approximation described above can also be conceived of as a multiple linear regression model, where the original signal $x(t)$ is expressed in terms of its coefficients. In such a multiple linear regression model, the analysis of variance technique is a statistical method used to quantify the amount of variability accounted for by each term in a multiple linear regression model. The analysis of variance technique can be used in the process of reducing a multiple linear regression model by identifying those terms in the original model that explain the most significant amount of variance. Using the analysis of variance methodology, the amount of variance in the original signal explained by the sixth approximation signal and each of the detail signals can be calculated. The results indicate that the detail signals $d_1$, $d_2$, $d_5$, and $d_6$, contribute less than 5% each in the variance of the original signal.

The modeling and forecast of aggregate demand can be facilitated if the model of the data can be reduced to a simple model of two parameters, one corresponding to the overall long-term trend and the second accounting for the bulk of the variability. The overall trend may be depicted by $c_6$, and the detail signal $d_3$, carries the majority of the energy among all the detail signals. Thus one possible reduced model is:

$$x(t)=c_6(t)+\beta d_3(t)+e(t)$$

Using the least squares method, the value of $\beta$ for each of the traces with collected link utilization data modeled as described above may be calculated. The $\beta$ calculated for all traces were between 2.1 and 2.3. Using the analysis of variance technique, this model of the signal may be evaluated with respect to the proportion of variance it accounts for. If $x(t)$ is the collected link utilization data, and if $e(t)$ is the error incurred in the new model, error may be calculated by defining $SSX=\Sigma_{t=1}^{n}(x(t))^2$ and $SSE=\Sigma_{t=1}^{n}e(t)^2$. The total sum of the squares, designated SST, may be defined as the uncertainty that would be present if one had to predict individual responses without any other information. Thus $SSX=\Sigma_{t=1}^{n}(x(t)-\bar{x})^2$. The analysis of variance methodology partitions this variability into two parts. One part is accounted for by the new model. It corresponds to the reduction in uncertainty that occurs as the regression model is used to predict the response. The remaining portion is the uncertainty that remains even after the model is used. SSR may be defined as the difference between SST and SSE. This difference represents the sum of the squares explained by the regression. The fraction of the variance that is explained by the regression, or SSR/SST determines the quality of the regression and is called the coefficient of determination, and is denoted $R^2$. The model may be considered to be statistically significant if it can account for a large fraction of the variability in the response, that is to say if it yields large values for $R^2$. The results obtained for the value of $\beta$ and $R^2$ for all eight traces examined herein are:

| Trace ID | 1 | 2 | 3 | 4 | 5 | 6 | 7 | 8 |
|---|---|---|---|---|---|---|---|---|
| $\beta$ | 2.09 | 2.06 | 2.11 | 2.23 | 2.12 | 2.18 | 2.13 | 2.16 |
| $R^2$ | 0.87 | 0.94 | 0.89 | 0.87 | 0.92 | 0.80 | 0.86 | 0.91 |

The new model, as can be seen, explains 80% to 94% of the variance in the signal.

From the above described wavelet multiresolution analysis several conclusions may be drawn. First, there is a clear overall long-term trend present in the traces. Second, the fluctuations around the long-term trend are mostly due to periodic changes in traffic bandwidth at a time scale of twelve hours. Third, the long-term trend and the detail signal at the third time scale, representing the twelve hour fluctuation, account for approximately 98% of the total energy of the collected link utilization data.

From the analysis of variance procedure, further conclusions may be reached. First, the largest amount of variance in the original signal can be explained by its long-term trend, denoted as $c_6$, and the detail signals $d_3$ and $d_4$ at the time scales of twelve and twenty-four hours, respectively. Second, the original signal can be sufficiently approximated by the long-term trend and its third detail signal, $d_3$, as a model that explains approximately 90% of the variance in the collected link utilization data.

Based upon the above observations, a generic model for the time series may be created. This model is based upon the model above, where β=3, for a common model across the entire backbone. This model may slightly overestimate aggregate demand between two adjacent PoPs, but such an overestimation may be beneficial for capacity planning purposes:

$$\chi'(t) = c_6(t) + 3d_3(t)$$

For forecasting future link utilization at a time scale of weeks or months the short term fluctuations likely need not be accurately modeled. Particularly for capacity planning purposes, the IP network operator need only know the traffic baseline for the future and the likely fluctuation of traffic around this baseline. In the equation above, $d_3(t)$ is defined for every ninety minute interval in the measurements capturing the short term fluctuations at the time scale of twelve hours. Because the specific behavior within a day is likely not important for capacity planning purposes weeks or months in the future, the standard deviation of $d_3$ may be calculated for each day. The weekly standard deviation, denoted $dt_3(j)$, as the average of the seven deviation values computed within each week. This value represents the fluctuations of traffic around the long-term trend forecast from day to day within each particular week.

Figure 13:
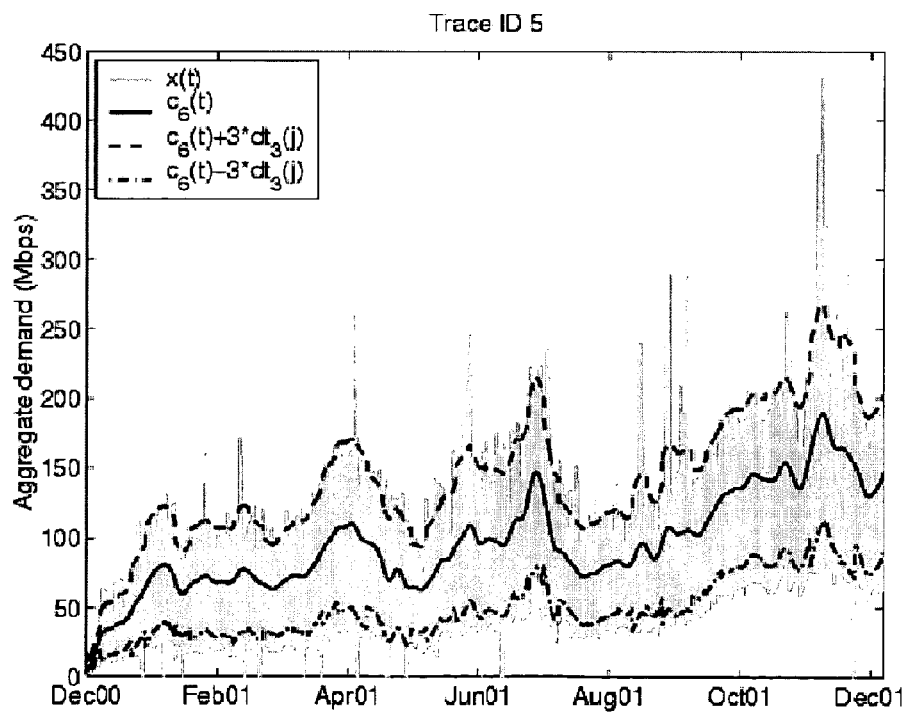
FIG. 13 illustrates the link utilization approximation signal of one link and the average daily standard deviation for the link utilization.

Referring now to FIG. 13, the aggregate demand for trace five is shown as determined from the collected SNMP data. FIG. 13 further illustrates the long-term trend in the data, along with two curves showing the approximation of the signal as the sum of the long-term trend plus or minus three times the average daily standard deviation within a week, as described above. As seen in FIG. 13, approximating the original signal in this manner expresses the fluctuations of the data around the baseline long-term trend with considerable accuracy. It should be noted that the new signal, $dt_3$, features one value every week, expressing the average daily standard deviation within that week. The long-term trend may likewise be approximated with a more compact time series featuring one value for every week. It should be recalled in this regard that forecasting is likely to be performed weeks or months in advance for capacity planning purposes, rendering fluctuations over a twenty-four hour time period unlikely to be important for such forecasting, so long as the deviation of short term periodicities are accounted for in the total forecast demand. Given that the sixth approximation signal is a very smooth approximation of the original signal, its average may be calculated across each week and denoted as a new time series l(j) expressing the long-term trend from one week to the next. Thus, the forecasting process will have to predict the behavior of:

$$\hat{x}(j) = l(j) + 3dt_3(j)$$

where j denotes the index of each week in the trace.

Figure 14:
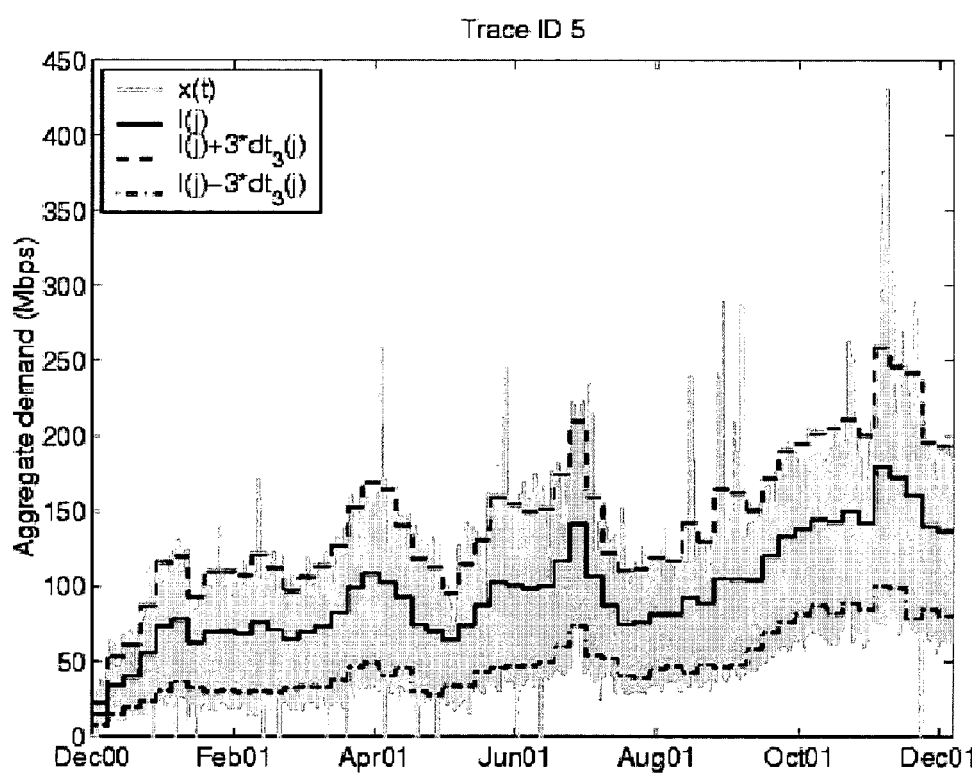
FIG. 14 illustrates an approximation of collected link utilization data using the average weekly long-term trend and the average daily standard deviation.

Referring now to FIG. 14, the signal resulting from the above equation is illustrated. As shown, the approximation of the original signal using weekly average values for the overall long-term trend and the daily standard deviation results in a model that accurately reflects the observed behavior. While the forecast link utilization is made on a weekly basis, that weekly forecast incorporates both the long-term trend and the deviation around the long-term trend due to short periodicities. Accordingly, the use of linear time series models are likely to be useful in deriving forecasts for future link utilization and deviation around the forecast future link utilization. Both of these values are useful for capacity planning purposes weeks or months in advance.

Constructing a time series model for forecasting purposes implies expressing X, in terms of previous observations $X_{t-j}$ and noise terms $Z_t$ that correspond to external events. The noise terms $Z_t$ may be assumed to be uncorrelated with a zero mean and finite variance. These are the simplest processes to model and are said to have no memory, because their value at a time t is uncorrelated with all past values up to time t−1.

Several forecasting models are known, including linear models. Three known linear forecasting models are the autoregressive model, the moving average model, and the autoregressive moving average model. A time series x, is an autoregressive moving average model if $x_t$ is stationary and if for every t $X_t - \phi_1 X_{t-1} - \ldots - \phi_p X_{t-p} = Z_t + \theta_1 Z_{t-1} + \ldots + \theta_q Z_{t-q}$. If p=0, then the model reduces to a pure moving average process, while if q=0 the process reduces to a pure autoregressive process. This equation can also be written in a more concise form as:

$$\phi(B) X_t = \theta(B) Z_t$$

In the above equation, $\phi(\bullet)$ and $\theta(\bullet)$ are the $p^{th}$ and $q^{th}$ degree polynomials and B is the backward shift operator $B^j X^t = X_{t-j}$ and $B^j Z_t = Z_{t-j}$ where j=0, +1, . . . .

It should be noted that the autoregressive moving average model fitting procedure assumes that the data is stationary. The data may not be stationary in many applications of the present invention. If a time series exhibits variations that render it nonstationary, there are approaches known in the art that may be used to render the time series stationary. One such method is what is often referred to as a differencing operation, where the lag−1 difference operator ∇ may be defined by:

$$\nabla X_t = X_t - X_{t-1} = (1 - B) X_t$$

In the above equation, B is the backward shift operator. If the nonstationary portion of a time series is a polynomial function of time, then differencing a finite number of times can reduce the time series to an autoregressive moving average process. An ARIMA (p, d, q) model, is an autoregressive moving average model that has been differenced d times. It may be written in the form:

$$\phi(B)(1-B)^d X_t = \theta(B) Z_t, Z_t \sim WN(0, \sigma^2)$$

If the time series has a non-zero average value through time, the above equation also includes a constant term μ on the right hand side.

The above techniques have been verified by use upon collected link utilization data. In order to model the components l(j) and $dt_3$ (j) using linear time series models, collected link utilization data was separated into two parts. The first part was used to construct the model parameters used to forecast later data, which was the second part of the data. The second part of the data was used to evaluate the forecast made by the selected model. In accordance with the above, six months of collected link utilization data was used to evaluate the accuracy of the forecast made based upon the first portion of the link utilization data. Of course, in actual practice the methods in accordance with the present invention would be used to forecast future link utilization.

A known methodology referred to as the Box-Jenkins methodology may be used to fit linear time series models. This procedure requires the steps of determining the number of differencing operations needed to render a time series stationary, determining the values of p and q, estimating the polynomials φ and θ, and evaluating how well the derived model fits the collected data. The estimation of the model parameters may be done using a maximum likelihood estimation. The model chosen as the best model and used for forecasting purposes may be the one that provides the smallest statistical fitting indices while also offering the smallest mean square prediction error six months ahead. Examples of acceptable statistical fitting indices are forward predictive error (FPE), Akaike Information Criterion (AICC), and BIC.

The models computed for the long-term trend l(j) in the present example indicate that the first difference of these time series is consistent with a simple moving average model with one or two terms plus a constant value µ. The need for one difference in operation at lag–1 and the existence of the term µ across all models indicate that the long-term trend across the traces for collected data is a simple exponential smoothing with growth. The trajectory of the long-term forecast resulting will typically be a sloping line with a slope equal to µ. For example, for trace-1 the long-term forecast corresponded to a weekly increase of 0.5633 megabits per second. This forecast represents the average aggregate demand of a link in the aggregate in the future. The weekly increase in total demand between two adjacent Points of Presence can thus be estimated through the multiplication of this value with the total number of active links in the aggregate between that pair of PoPs. Based upon this analysis and the estimates of u across all models, it can be observed that in the present example all traces exhibit upward trends, but at different rates of growth.

A similar process may be used to forecast future deviation of link utilization by applying the Box-Jenkins methodology to the deviation measurements. It should be noted that in the present example some models of the deviation can be expressed with simple autoregressive models, while others can be accurately modeled as a moving average process after one differencing operation. For example, the deviation for traces one, five, and eight increase with time at rates one order of magnitude smaller than the increase in their long-term trends, while the deviation for traces four and six can be approximated with a weighted moving average, which indicates a slower evolution.

From the above discussion, it can be seen that in the present example one cannot arrive at a single network wide forecasting model for the link utilization between pairs of PoPs. Different parts of the IP network grow at different rates, which is expressed as the long-term trend forecast, and different parts of the IP network also experience different types of variation, which is the deviation around the long-term trend.

The above models may be used to predict a baseline aggregate demand for a particular week in the future, and may forecast deviations around that baseline. The overall forecast for inter PoP aggregate demand may then be calculated using the prior stated:

$$\hat{x}(j) = l(j) + 3dt_3(j)$$

While the forecast deviation may be above or below the forecast link utilization, it should be noted that the deviation above the forecast is likely to be of greater importance for purposes of capacity planning, as a deviation below the forecast baseline would not require additional network resources.

Figure 15:
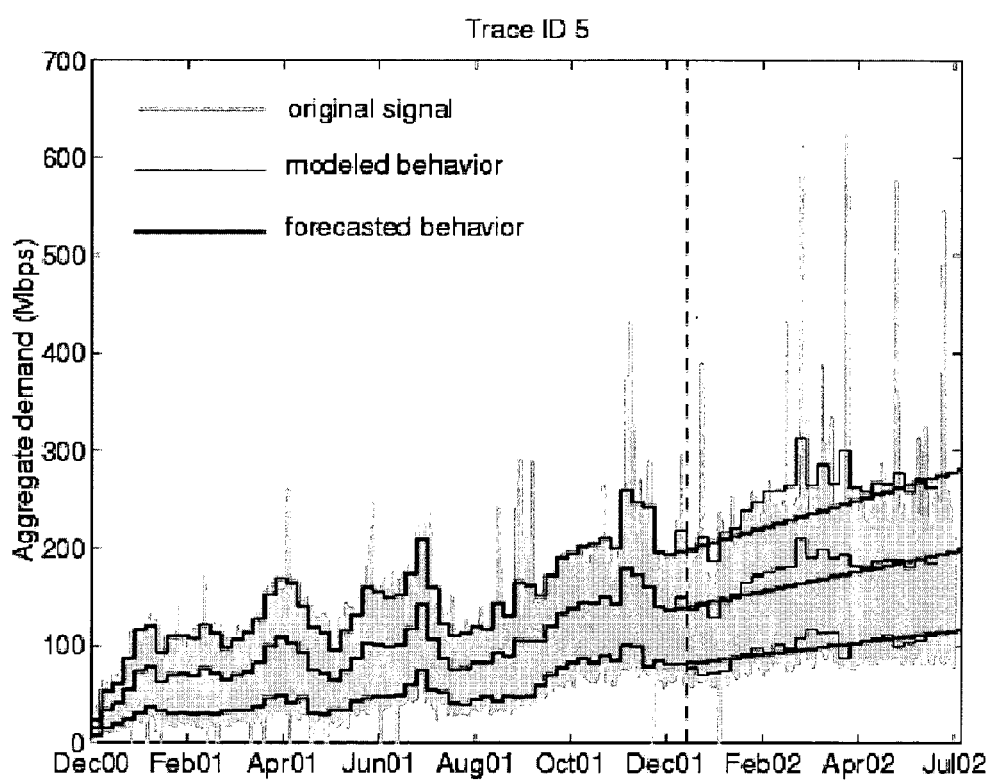
FIG. 15 illustrates a forecast of link utilization made in accordance with the present invention.

Referring now to FIG. 15, collected link utilization data including the second part of the data and the forecast link utilization are illustrated for comparison. As can be seen in reference to FIG. 15, the behavior forecast in accordance with the present invention based upon collected link utilization data closely reflects actual collected link utilization data for the forecast period.

To quantify the quality of the predictions with the observed link utilization data, the multiresolution analysis may be applied to the measurements in the evaluation period. The long-term trend l(j) may then be calculated, as may the weekly deviation $dt_3(j)$ for each week in the forecast period.

Using the above equation, $\hat{x}(j)$ may then be computed. Finally, the error in the derived forecast may be calculated as the forecast value minus $\hat{x}(j)$, divided by $\hat{x}(j)$.

Figure 16:
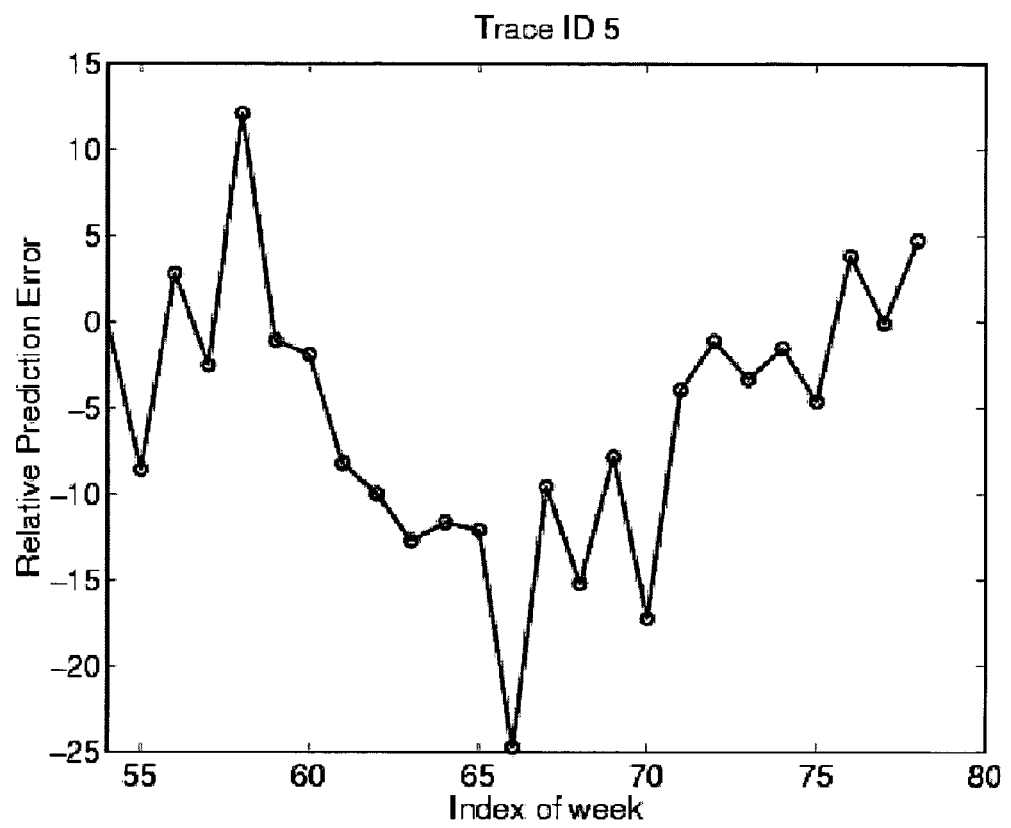
FIG. 16 illustrates a weekly relative prediction error for a link utilization forecast made in accordance with the present invention.
Figure 17:
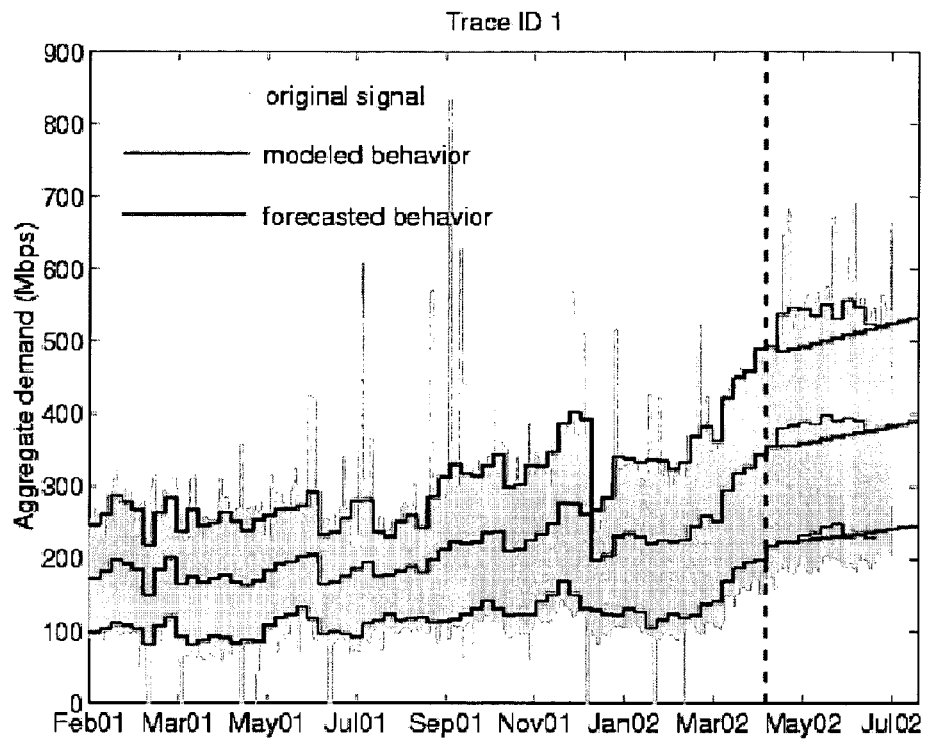
FIG. 17 illustrates weekly link utilization forecasts for a link made in accordance with the present invention.
Figure 18:
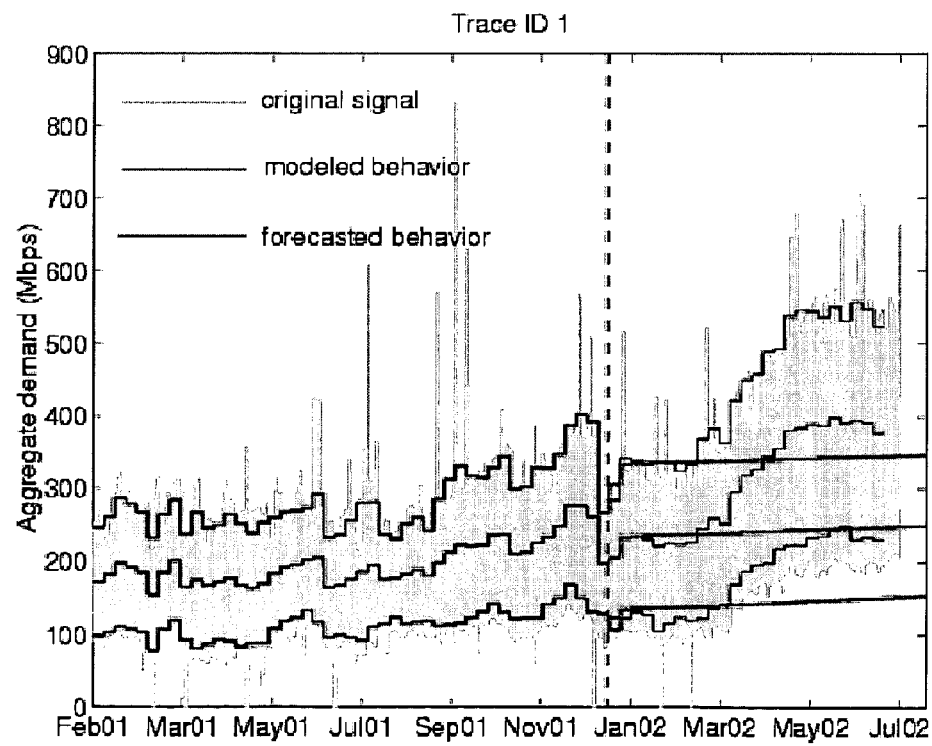
FIG. 18 illustrates adjusted weekly link utilization forecasts for a link made in accordance with the present invention.

Referring now to FIG. 16, the relative error between the derived forecast and $\hat{x}(j)$ for each week in the evaluation period is illustrated. A negative error illustrated in FIG. 16 indicates that the actual demand was higher than the forecast demand. As shown in FIG. 16, the forecast error fluctuates with time but is centered near zero. This means that on average aggregate demand was correctly forecast in this example. Twenty-four weeks into the future the forecast prediction error was 4%. The average prediction error across all weeks was –3.6%. For all five traces for which future link utilization behavior was forecast, the average absolute relative prediction error was lower than 15%.

The above-described invention is particularly useful for collecting, modeling, and forecasting traffic between adjacent PoPs in an IP network. While the above methods may be used to forecast IP traffic volume and deviation over many time frames, it is particularly well suited to the forecast of demand weeks or months in advance. As one skilled in the art will realize, longer term forecasts, for example those exceeding six months, may be made using the present invention but will be subject to greater uncertainty.

What is claimed is:

1. A method for determining link utilization in an IP network, the method comprising:
   collecting utilization values for links in the IP network over a predetermined polling period;
   collecting topological information for links in the IP network, the topological information identifying each link connecting each adjacent Point of Presence;
   correlating the link utilization values with the topological information;
   summing the link utilization values for all links connecting a pair of Points of Presence over a predetermined measurement period;
   dividing the sum by the number of link utilization values included in the sum to give an average link utilization; and
   multiplying the average link utilization by the number of links connecting the pair of Points of Presence to calculate a measure of total traffic flowing between the pair of Points of Presence that is insignificantly effected by one or more missing utilization values.

2. The method for determining link utilization of claim 1, further comprising:
   calculating aggregate link demand.

3. The method for determining link utilization of claim 2, wherein calculating aggregate link demand comprises:
   identifying the Point of Presence pairs connected by each link using the topological information;
   summing the utilization values collected for each of the links connecting a Point of Presence pair over a predetermined time period; and
   dividing the sum of link utilization values for each Point of Presence pair by the number of utilization values included in the sum.

4. The method for determining link utilization of claim 3, wherein the predetermined time period is at least twice as long as the predetermined polling period.

5. A method for determining link utilization in an IP network, the method comprising:
   collecting link utilization values from routers in the IP network over a predetermined polling period;
   collecting topological information from routers in the IP network;

correlating link utilization values with the topological information by identifying the Points of Presence pairs connected by each link for which a link utilization value was collected;

summing the link utilization values for each link connecting a pair of Points of Presence;

dividing the sum of link utilization values for the pair of Points of Presence by the number of link utilization values included in the sum to give an average link utilization; and multiplying the average link utilization by the number of links connecting the two Points of Presence to calculate a measure of total traffic flowing between the two Points of Presence that is insignificantly effected by one or more missing utilization values.

6. The method for determining link utilization of claim 5, wherein collecting incoming and outgoing link utilization values from routers in the IP network further comprises each router transmitting SNMP messages using UDP transport protocol.

7. The method for determining link utilization of claim 6, wherein collecting link utilization values from routers in the IP network comprises:
receiving an exponentially weighted moving average of link utilization measurements for a first short time frame; and
averaging the received moving average link utilization measurements over a second longer time frame.

8. The method for determining link utilization of claim 6, wherein collecting link utilization values from routers in the IP network comprises:
receiving the total number of bytes transmitted over a link for a first short time frame; and
averaging the received total number of bytes over a second longer time frame.

9. The method for determining link utilization of claim 6, wherein collecting link utilization values from routers in the IP network comprises:
receiving the total number of bytes received over a link for a first short time frame; and
averaging the received total number of bytes over a second longer time frame.

10. The method for determining link utilization of claim 6, wherein collecting link utilization values from routers in the IP network comprises:
receiving the total number of bytes transmitted and received for a link over a first short time frame; and
averaging the received total number of bytes for a second longer time frame.

11. The method for determining link utilization of claim 6, wherein downloading configuration information comprises downloading the name of each router, the Point of Presence containing each router, all active links connected to each router, and the destination of each active link connected to each router.

12. The method for determining link utilization of claim 11, wherein collecting topological information from routers comprises downloading configuration information at predetermined time intervals.

13. The method for determining link utilization of claim 12, wherein the predetermined time intervals at which configuration information is downloaded comprises one week.

14. The method for determining link utilization of claim 13, wherein collecting incoming and outgoing link utilization values from the routers in the IP network comprises collecting incoming and outgoing link utilization values from all routers in the IP network.

15. The method for determining link utilization of claim 14, wherein collecting topological information from routers in the IP network comprises collecting topological information from all routers in the IP network.

16. A method for determining aggregate link utilization between two Points of Presence, wherein a plurality of links connects the two Points of Presence, the method comprising:
collecting link utilization values for one or more links connecting the two Points of Presence over a predetermined polling period, wherein at least one link connecting the two Points of Presence corresponds with one or more missing utilization values over the predetermined polling period;
summing the link utilization values for all links connecting the two Points of Presence over a predetermined measurement period;
dividing the sum by the number of link utilization values included in the sum to give an average link utilization; and
multiplying the average link utilization by the number of links connecting the two Points of Presence to calculate a measure of total traffic flowing between the two Points of Presence that is insignificantly effected by the one or more missing utilization values.

17. The method for determining aggregate link utilization between two Points of Presence of claim 16, wherein collecting link utilization data for each link connecting the two Points of Presence comprises:
each router in the two Points of Presence providing incoming and outgoing link utilization information, the incoming and outgoing link utilization information being an average over a short period of time; and
averaging the incoming and outgoing link utilization information over a longer period of time.

18. The method of determining aggregate link utilization between two Points of Presence of claim 17, wherein the incoming and outgoing link utilization information further comprises an exponentially weighted moving average.

19. The method for determining aggregate link utilization between two Points of Presence of claim 18, wherein the longer period of time over which the incoming and outgoing link utilization information is averaged comprises ninety minutes.

20. At least one machine readable media for causing at least one network management station in an IP network to perform a method for determining link utilization in an IP network, the method comprising:
collecting incoming and outgoing link utilization values from routers over a predetermined polling period;
correlating the link utilization values with the topological information;
summing the link utilization values collected over a first predetermined time period for links connecting a pair of Points of Presence, wherein at least one link connecting the pair of Points of Presence has one or more missing utilization values;
dividing the sum by the number of link utilization values included in the sum to give an average link utilization;
calculating a measure of total traffic flowing between the pair of Points of Presence by multiplying the average link utilization by the number of links connecting the pair of Points of Presence to compensate for the one or more missing utilization values of the at least one link connecting the pair of Points of Presence; and collecting topological information from the routers at one or more second predetermined time intervals, the topological information identifying each link connecting the pair of Points of Presence.

21. The at least one machine readable media of claim 20, wherein the first predetermined time period is at least twice as long as the polling period.

22. The at least one machine readable media of claim 21, wherein the polling period comprises five minutes.

23. The at least one machine readable media of claim 22, wherein the first predetermined time period comprises ninety minutes.

24. The at least one machine readable media of claim 23, wherein the second predetermined time intervals comprise one week.

\* \* \* \* \*